US007101584B2

(12) United States Patent
Papathanasopoulos

(10) Patent No.: US 7,101,584 B2
(45) Date of Patent: Sep. 5, 2006

(54) MICRO-MOLECULAR HYPER-SATURATION OF CONVENTIONAL COOKING OILS FOR HIGH ALTITUDE AND CONFINED SPACE APPLICATIONS

(76) Inventor: Gus Papathanasopoulos, 496 New Hope Dr., Altamonte, FL (US) 32714

( * ) Notice: Subject to any disclaimer, the term of this patent is extended or adjusted under 35 U.S.C. 154(b) by 268 days.

(21) Appl. No.: 10/442,727

(22) Filed: May 20, 2003

(65) Prior Publication Data

US 2003/0215557 A1    Nov. 20, 2003

Related U.S. Application Data

(60) Provisional application No. 60/381,680, filed on May 20, 2002.

(51) Int. Cl.
*A23D 9/00* (2006.01)
(52) U.S. Cl. .................. 426/606; 426/601; 426/607
(58) Field of Classification Search ......... 426/601–613
See application file for complete search history.

(56) References Cited

U.S. PATENT DOCUMENTS

| | | | | |
|---|---|---|---|---|
| 2,442,531 | A | | 6/1948 | Eckey |
| 2,914,546 | A | * | 11/1959 | Barsky et al. ............. 554/227 |
| 2,988,483 | A | * | 6/1961 | Barsky et al. ............. 426/605 |
| 3,006,771 | A | * | 10/1961 | Babayan .................... 426/607 |
| 3,542,560 | A | | 11/1970 | Tomarelli |
| 3,796,581 | A | * | 3/1974 | Frommhold ................ 426/601 |
| 3,873,729 | A | * | 3/1975 | Kubota et al. .............. 426/40 |
| 3,997,682 | A | * | 12/1976 | Allen ......................... 426/534 |
| 4,096,258 | A | | 6/1978 | Hanson |
| 4,192,898 | A | | 3/1980 | Hanson |
| 4,208,445 | A | * | 6/1980 | Cottier et al. ............. 426/607 |
| 4,341,812 | A | * | 7/1982 | Ward .......................... 426/603 |
| 4,341,813 | A | * | 7/1982 | Ward .......................... 426/603 |
| 4,410,557 | A | * | 10/1983 | Miller ......................... 426/607 |
| 4,482,576 | A | | 11/1984 | Boot et al. |
| 4,605,563 | A | * | 8/1986 | Heine et al. ................ 426/607 |
| 4,721,626 | A | * | 1/1988 | Rule ........................... 426/601 |
| 4,832,975 | A | * | 5/1989 | Yang .......................... 426/607 |
| 4,865,859 | A | * | 9/1989 | Porcello et al. ............ 426/250 |
| 4,948,618 | A | | 8/1990 | Hirokawa et al. |
| 5,275,835 | A | * | 1/1994 | Masterson et al. ......... 426/607 |
| 5,288,512 | A | * | 2/1994 | Seiden ........................ 426/607 |
| 5,306,515 | A | * | 4/1994 | Letton et al. ............... 426/531 |
| 5,380,544 | A | * | 1/1995 | Klemann et al. ........... 426/607 |
| 5,395,629 | A | * | 3/1995 | Bertoli et al. .............. 426/35 |
| 5,411,756 | A | | 5/1995 | Wheeler et al. |
| 5,468,507 | A | * | 11/1995 | Czap .......................... 426/99 |
| 5,492,714 | A | * | 2/1996 | Guskey et al. ............. 426/607 |
| 5,571,553 | A | * | 11/1996 | Stein .......................... 426/607 |
| 5,843,497 | A | * | 12/1998 | Sundram et al. ........... 426/2 |
| 5,874,117 | A | * | 2/1999 | Sundram et al. ........... 426/2 |
| 6,096,351 | A | | 8/2000 | Sassen |
| 6,106,885 | A | * | 8/2000 | Huizinga et al. .......... 426/607 |
| 6,156,369 | A | | 12/2000 | Eger et al. |
| 6,210,739 | B1 | * | 4/2001 | Nalur ......................... 426/607 |
| 6,793,959 | B1 | * | 9/2004 | Nakhasi et al. ............ 426/609 |
| 6,835,408 | B1 | * | 12/2004 | Takeuchi et al. ........... 426/606 |
| 2003/0215556 | A1 | * | 11/2003 | Naber et al. ................ 426/601 |
| 2004/0115332 | A1 | * | 6/2004 | Teran et al. ................ 426/609 |
| 2004/0191391 | A1 | * | 9/2004 | Takeuchi et al. ........... 426/604 |

FOREIGN PATENT DOCUMENTS

| | | |
|---|---|---|
| EP | 0 488 800 | 6/1992 |
| JP | 7-203848 | 8/1995 |

OTHER PUBLICATIONS

The National Academy of Sciences, "Nutritional Needs I nCold and High-Altitude Environments: Applications for Military Personnel in Field Operations", National Academy Press (1996) pp. 1-469.

Food and Drug Administration, Federal Register 64 FR 62745, "FDA Proposes New Rules for Trans Fatty Acids in Nutrition Labeling, Nutrient Content Claims, and Health Claims", HHS News (1999), Proposed Rule [Federal Register: Nov. 17, 1999 (vol. 64, No. 221)] [Proposed Rules], pp. 62745-62825 [DOCID:fr17no99 28] www.cfsan.fda.gov.

Lutz et al., "Activities of Lipoprotein Lipase and Hepatic Lipase on Long-and Medium-Chain Triglyceride Emulsions Used in Parenteral Nutrition", Metabolism (1989) vol. 38, No. 6, pp. 507-513.

Ney et al., "Total Parenteral Nutrition Containing Medium-vs. Long Chain Triglyceride Emulsions Elevates Plasma Cholesterol Concentrations in Rats[1,2,3]", Am. Institute of Nutrition (1993) pp. 883-892.

(Continued)

*Primary Examiner*—Carolyn Paden
(74) *Attorney, Agent, or Firm*—McHale & Slavin, P.A.

(57) ABSTRACT

The instant invention is directed toward a process of Micro-Molecular Hyper-Saturation or Microsaturation, which results in transforming common, whole, Essential Fatty Acid (EFA) rich cooking oils into a product exhibiting increased shelf life wile simultaneously eliminating or severely decreasing the need for hydrogenation; and resulting in an end product specific to the extreme operational profile necessary to accommodate unique nutritional requirements. The method of manufacture and product produced thereby relates to the functional molecular engineering of the fatty acid profile of traditional cooking oils to accommodate unique nutritional requirements, to provide a nutritional product capable of supporting individuals working in an extreme operational envelope associated with, e.g. high altitude and confined space nutrition, thereby reducing obesity and its associated heart disease problems, as well as providing a healthy, dense calorie regimen, for recovering third world famine influenced human populations.

8 Claims, No Drawings

OTHER PUBLICATIONS

Ikeda et al., "Lymphatic Absorption of Structured Glycerolipids Containing Medium-Chain Fatty Acids and Linoleic Acid, and Their Effect on Cholesterol Absorption in Rats", Lipids (1991) vol. 26, No. 5, pp. 369-373.

Abstract: Bellinati-Prees R Waitzberg DL, Salgado, Carneiro-Sampaio MM., "Functional Alterations of Human Neutrophils by Medium Chain Triglyceride emulsions", Journal of Leucocyte, Biology (1993) vol. 54, No. 4, pp. 404-410.

Odle, et al., "Utilization of Medium-Chain Triglycerides by Neonatal Piglets", J. Anim. Sci. (1989) vol. 67, pp. 3340-3351.

Lutz et al, "Fat emulsion particle size: influence on the clearance rate and the tissue lipolytic activity", Am. J. Clinical Nutrition (1989) vol. 50, pp. 1370-1381.

Swenson et al., "Persistence of metabolic effects after long-term oral feeding of a structured triglyceride derived from medium-chain triglyceride and fish oil in burned and normal rats", Metabolism (1991) vol. 40, No. 5, pp. 484-490. [PubMed www.ncbi.ntm.nih.gov.

DeGaetano, et al., "Kinetics of Medium-Chain Triglycerides and Free Fatty Acids in Healthy Volunteers and Surgically Stressed Patients", J. Parenteral and Enteral Nutrition (1994) vol. 18, No. 2, pp. 134-140.

Van Zyl, e tal., "Effects of medium-chain triglyceride ingestion on fuel metabolism and cycling performance", Am Physiological Society (1996) pp. 2217-2225.

Strothard, et al., "Infusion of Long-Chain or Medium-chain Triglycerides Inhibits Peripheral Glucose Metabolism in Men", J. Parenteral and Enteral Nutrition (1994) vol. 18, No. 5, pp. 436-441.

Anderson, et al., "Glucogenic and Ketogenic Capacities of Lard, Safflower Oil, and Triundecanoin in Fasting Rats" J. Of Nutrition (1975) 105; pp. 185-189.

Lima, et al., "Neonatal Parenteral Nutrition with a Fat Emulsion Containing Medium Chain Triglycerides", Acta Paediatr Scand (1988) vol. 77, pp. 332-339.

Abstract Furuse, et al., Feeding behavior in chickens given diets containing Mct,British Poultry Science 34 (1993).

Abstract: Rolls, et al, "Foot intake in dieters and nondieters after a liquid meal containing medium-chain triglycerides", American Journal of Clinical Nutrition (1998) vol. 48, No. 166-71. Website: www.ajcn.org/cgi/content/abstract.

Abstract: Furuse, et al., "Feeding Behavior in Rats Fed Diets Containing Medium Chain Triglyceride", Physiology and Behavior (1992) vol. 54, No. 4.

Abstract: Jeevanandam, et al., "Efficacy of a mixture of medium-chain triglyceride (75%) and long-chain triglyceride (25%) fat emulsions in the nutritional management of multiple-trauma patients", Nutrition (1995) vol. 11, No. 3, pp. 275-284. PubMed: www.ncbi.nlm.nih.gov.

Ball, "Parenteral nutrition using MCT/LCT or LCT: Effect on the fatty acid composition of plasma triglycerides and platelet phospholipids", Clinical Nutrition (1992) vol. 11, pp. 216-222.

Abstract Beckers, et al, "Gastric Emptying of Carbohydrate-medium chain triglyceride suspensions at rest", Journal of Sports Medicine (1992) vol. 13, No. 8.

Abstract. Chassard, et al., "Effects of intravenous medium chain triglycerides on pulmonery gas exchanges in mechanically ventilated patients", Critical Care Medicine (1994) vol. 22, No. 2, pp. 248-251.

Abstract: Mingrone, et al., "Kinetics and thermogenesis of medium-chain monocarboxylic and dicarboxylic acids in man: sebacate and medium-chain triglycerides", Journal of Parenteral and Enteral Nutrition (1993) vol. 17, No. 3, pp. 257-264.

Abstract: Gogos, et al., "Effect of different types of total parenteral nutrition on T-lymphocyte subpopulations and NK cells", Am. Journal of Clinical Nutrition (1990) vol. 51, pp. 119-122. Website: www.ajcn.org/cgi/content/abstract.

Davies, et al., "Fatty Acid Synthesis Genes: Engineering the Production of Medium-chain Fatty Acids", Fatty Acid Synthesis Genes p. 176-181; Website: http://newcrop.hort.purdue.edu/newcrop/proceedings1993/v2-176.html (May 16, 2001).

Abstract Jiang, et al., "A comparison of medium-chain and long-chain triglycerides in surgical patients" Ann Surg (1193) vol. 217, No. 2, pp. 175-184: PubMed: www.ncbi.nlm.nih.gov.

Abstract: "Effects of long and medium chain triglycerides on aino acid uptake in rat intestinal brush border membrane vessicles", Comparative Biochecmistry & Physiology A-Comparative Physiology (1993) vol. 106, No. 4, pp. 719-723.

Abstract Wu, et al., "Gastrointestinal tolerance, fat absorption, plasma ketone and urinary dicarboxylic acid levels in lowbirth-weight infants fed different amounts of medium chain triglycerides in formula", Journal of Pediatric (1993) Gastroenterology and Nutrition, vol. 17, No. 2, pp. 145-152.

Abstract Wagner, et al., "Human Milk and Lactation", eMedicine Journal (2001) vol. 2, No. 6, pp. 1-16; Website: http://www.emedicine.com/ped/topic2594.htm (Jan. 16, 2002).

* cited by examiner

MICRO-MOLECULAR HYPER-SATURATION OF CONVENTIONAL COOKING OILS FOR HIGH ALTITUDE AND CONFINED SPACE APPLICATIONS

CROSS-REFERENCE TO RELATED APPLICATIONS

This application claims the benefit of Provisional Application No. 60/381,680, filed May 20, 2002, the contents of which are herein incorporated by reference in their entirety.

FIELD OF THE INVENTION

This invention relates to modified cooking oils, particularly to cooking oils which are uniquely combined with a mixture of structured triglycerides in a manner effective to yield an intra-spatially saturated configuration of micromolecules exhibiting hyper-saturation.

BACKGROUND OF THE INVENTION

Various extreme conditions create situations which dictate extraordinary nutritional requirements. Examples of such conditions include high altitude and its' associated cold environment, and long term confined space operations. Examples of these conditions include Submarine based S.E.A.L. team deployment with E.V.A (dark, cold water submersible deployment), long term special-forces high altitude pursuit, after lengthy staging operations, interplanetary travel, such as a Mars mission) or extended space station operations, where the decreased spacesuit pressure mimics high altitude, often requiring high energy, high calorie Extra Vehicular Activity. Such conditions have, for the longest time, presented a most difficult human operational envelope, requiring highly specific but as yet unrealized nutritional tools.

Man's ability to continually expand the human element in extreme operations, relies in large part on an ability to create products which are capable of satisfying nutritional needs above and beyond the current scope of the food and nutritional industries.

The current lack of nutritional resources sufficient to provide the required dense calorie logistics is significantly limiting the expansion of the human operational threshold. The statement of need is perhaps better articulated by the Academy of Sciences in their 1996 thorough report, "Nutritional Needs in Cold and High-Altitude Environments: Applications for Military Personnel in Field Operations"

There is no question that operational logistics would benefit from a dense, healthy fat, calorie platform. The Academy's recommendations following this most exhaustive, functional research compilation on the subject to date, shows their desire to entertain a dense fat calorie regimen. Concern over conventional dietary fat, cholesterol intake and the pathogenesis of atherosclerosis, strokes, and Coronary Heart Disease (CHD) steers them towards their suggested compromise diet of 12–15% Protein, 60% Carbohydrate (CHO) and 25–28% Fat. However by their own account, "The easiest way for military feeding systems to provide for increased caloric needs during cold-weather operations is to include additional dietary fats. Diets containing more of the high density fat fuels may become an operational necessity."

Animal fats and cooking oils are the fat rich dietary elements currently employed in military and space rations. Supplements with a modestly higher fat content tested in 1991, did not result in sufficient energy intake.

The greatest fear voiced by the Academy is that by introducing additional fats they would be increasing the risk of coronary heart deaths. This fear was echoed in the FDA's address of Trans Fatty Acids and Hydrogenation in its' 1999 response to the Department of Health and Human Services, specifically, "Trans Fatty Acids in Nutrition Labeling, Nutrient Content claims, and Health claims", echoing the Academy's concerns.

The cooking oil formulation of the instant invention is designed to replace current cooking oils, thereby providing the healthiest possible dense calorie scenario for a uniquely defined operational profile, while simultaneously providing a formulation which allays the Academy's fears.

PRIOR ART

U.S. Pat. No. 6,156,369 discloses a food spread which comprises a non-aqueous mixture of an edible oil and a mono-glyceride. The '369 patent does teach a method for forming the food spread which consists of a first heating step albeit to a temperature of 113 to 167 degrees Fahrenheit, but without the vortex mixing which is required by the instantly disclosed invention.

U.S. Pat. No. 5,411,756 discloses fat mixtures which are enriched triglycerides having long saturated fatty acid residues preferably $C_{16}$ to $C_{22}$. This patent generally discloses a composition which must include a dairy protein and a fat component wherein at least about 25% of the fat component is a low calorie triglyceride or combination of plural low calorie triglycerides. Neither the disclosed composition, nor its method of making, suggest the conditions or processing steps necessary to form an intra-spatially saturated composition as is instantly disclosed.

U.S. Pat. No. 4,948,618 is directed toward a process for tempering edible plastic fat products such as margarine and shortening, which process comprises crystalizing, with cooling, a starting material including fats and oils with or without other ingredients and then subjecting the resulting product to pressurizing treatment. The process disclosed is essentially an extrusion process wherein the crystalized fat product is subjected to both a pressure and temperature sufficient to age said product. The requirement, as instantly disclosed, of vortical agitation and a velocity of approximately 3 to 10 miles per hour coupled with an increase in a compounds temperature between 85 and 95 degrees Fahrenheit is neither suggested or disclosed.

U.S. Pat. No. 4,482,576 is directed toward a method for treating an edible oil which is rich in linoleic acids so as to increase the solid fat content therein. The process comprises interesterification under isothermal conditions. The steps of interesterification, as required in the '576 patent, neither discloses nor suggests conditions suitable for forming an intra-spatially saturated long chain fatty acid as is instantly described.

U.S. Pat. No. 2,442,531 is directed toward a process for treating fats and fatty oils. This patent discloses a method for treating oils, for example palmitic and oleic, wherein palmitic acid and oleic acid are first mixed in particular proportions and the mixture is then reacted with glycerin to form triglycerides. This patent, at column 4 beginning at line 25, recognizes that fatty acid radicals in triglyceride fats have the ability to rearrange under proper conditions of treatment. The patent seeks to direct and control the rearrangement so as to achieve a result not heretofore obtained. By using a combination of low temperature and a suitable catalyst, rearrangement is permitted to take place at a temperature below that at which the liquid phase is saturated, thereby permitting crystallization of solid triglycerides of low solubility as such triglycerides are formed. This reference requires the use of a catalyst which is not suggested or required in order to perform the appropriate arrangement. In any event, intra-spatial saturated triglycerides, as instantly disclosed, are not produced via the process of the '531 patent.

U.S. Pat. No. 6,096,351 discloses edible vegetable fat compositions which do not contain hydrogenated fat and do contain 15 to 45 percent stearic acid, less than 15% palmitic acid, and from 45 to 80% unsaturated $C_{18}$ fatty acid residues, such that the combined amount of acids with 16 or more carbon atoms is at least about 95%. The process of this invention is essentially an ester interchange involving all three positions of glyceride to obtain an ester interchange fat and further more an optional blending step wherein from 10 to 100% of the ester interchanged fat is blended with up to 90% of a vegetable non-hydrogenated non-interesterified fat. This patent fails to disclose either the mixing or temperature conditions required in order to form the structured triglycerides of the instant invention, having an intra-spatially saturated construction as disclosed by the instant invention.

U.S. Pat. No. 4,832,975 discloses a reduced calorie edible fat/oil comprising tailored triglycerides having a particular combination of saturated medium and long chain fatty acids in combination with unsaturated long chain fatty acids. Both caloric reduction and acceptable autoignition characteristics are pointed toward as unique features, which are deemed to render the end product suitable for use in shortening and cooking oils. The tailored triglycerides herein disclosed, nevertheless fail to provide either the necessary process conditions, nor the appropriate initial blend of components necessary to result in a product having a saturated spatial configuration as is instantly disclosed.

SUMMARY OF THE INVENTION

The instant invention is directed toward a process of Micro-Molecular Hyper-Saturation or Microsaturation, which results in transforming common, whole, Essential Fatty Acid (EFA) rich cooking oils into a product exhibiting increased shelf life while simultaneously eliminating or severely decreasing the need for hydrogenation; and resulting in an end product specific to the extreme operational profile necessary to accommodate unique nutritional requirements.

Accordingly, it is a primary objective of the instant invention to teach a method, and a product produced thereby which relates to the functional molecular engineering of fatty acid profile of traditional cooking oils to accommodate unique nutritional requirements, as illustrated by NASA and the Military's extreme operational envelope associated with high altitude and confined space nutrition.

It is another objective of the instant invention to provide a novel saturation process for creating a product which displaces the need for unhealthy Long Chain Fatty Acids (LCFA).

It is an additional objective of the instant invention to provide a fatty acid profile closely related to human milk satiety.

It is a further objective of the instant invention to provide a product which follows a ketogenic obligatory alternative fat digestive pathway, thereby limiting corporal fat deposition and improving oxygen utilization, while displacing inefficiently caloric CHO as a primary energy source.

It is a still further objective of the instant invention to provide an improved nutritional product having a functionally engineered fatty acid profile for use by the general population.

It is yet an additional objective of the instant invention to provide a novel compositional performance enhancement process, which eliminates or greatly reduces the need for hydrogenation, while targeting specific physiologic needs and providing a healthy calorie dense alternative to unhealthy fats and carbohydrates, as a primary energy source.

It is yet a further objective of the instant invention to provide a product which exhibits enhanced shelf life and preservation characteristics without requiring hydrogenation.

Other objectives and advantages of this invention will become apparent from the following description taken in conjunction with any accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE INVENTION

The present invention uses a strategic combination of saturated short and medium chain fatty acids as a process tool, thereby providing the spatial saturation associated with the product produced in accordance with the instant invention. A pre-calculated molecular ratio for the polyunsaturated and monounsaturated fat molecules creates extended preservation qualities of such Long Chain Fatty Acids (LCFA). A ratio of 1.8 molecules of Medium Chain Fatty Acids vs Long Chain Fatty Acids has been studied in parenteral nutrition for in-vivo examination of speed of clearance by examination of the responsible enzymes of oxidation, Lipoprotein Lipase and Hepatic Lipase, revealing rapid clearance and rapid fatty acid availability to various tissues.

This molecular ratio, (extended to include 1.8–2), also plays a very important in-vitro application in that the saturated fats used (medium chain fatty acids), act as oxidative bumper guards for the mono and polyunsaturated long chain fatty acids in the resulting cooking oil, greatly extending its shelf life. While not wishing to be bound to any particular theory of operation, this preservation effect might be attributed to the observation that MCT treated neutrophils, upon lipid removal by cell washing in-vitro, showed decreased production of Hydrogen Peroxide, a substance well-known for the oxidation and break down of fats.

Molecular size and its associated clearance kinetics are highly important to the instant invention since an additional obligatory fat kinetic pathway is a key aspect. This invention uses 1–5% of $C_6$ as an in-vivo catalyst for this kinetic pathway, accelerating the entrance into the obligatory digestive pathway, allowing the liver to burn it as energy. C:b is also a significant molecular contributor to the in-vitro hypersaturation process. Molecular carbon chain length and its kinetics show slower kinetics of entry into circulation as chain length increases from $C_8$ to $C_9$ to $C_{10}$. This also would be consistent with the generally accepted belief that the rate of metabolism of fatty acids varies in proportion to their water solubility.

This may be supported by various studies on gastric emptying of carbohydrate and MCT suspensions, revealing that all MCT containing drinks emptied faster than the 100% Carbohydrate drink. This may be explained by observations that CHO content and osmolality increases with increases in MCT content, and that MCT may not inhibit gastric emptying as common fat does, due to a better solubility and absorption in the small intestine, resulting in a decreased duodenal-gastric feedback. This is very important for our high altitude applications, showing gastric compliance, since change of carbon chain formulation, for other human and non-human applications, while maintaining the integrity of our "microsaturation" process, may be crucial.

Fat emulsion particle size studies further indicate that, for a given quantity of triglycerides and phospholipids the lipolytic activity is proportional to the total interfacial area and that going from a long chain to medium chain triglycerides there is acceleration in the clearance rate of infused lipid.

Other absorption studies echo similar results and add that MCT are not only hydrolysed by the above enzymes, but also Lingual and Gastric Lipase which are incorporated into mucosal cells, where the hydrophilic properties continue intracellular hydrolyzation, further assisting as an obligatory fuel and aiding its digestive speed.

Parenteral or vein forced feeding of such medium chain fatty acids, however, may have a hypercholesterolemic affect. This LCFA known action is a voiced concern of the Academy. This is not true of enteral feeding, however. As described in the extended study, comparing plasma cholesterol concentrations in rats, with MCT-LCT vs. LCT and intragastric vs. intravenous showing elevated plasma cholesterol concentrations in the intravenous and not in the intragastric digestive pathway in groups fed our formula. Another MCT Cholesterol lowering study supportive of our MCT/LCT formulation in neonates, reveals a greater than 100% mean plasma cholesterol rise in the conventional fat fed group, as compared to our formulation.

Another concern voiced by the Academy for high altitude nutrition, is the potential for a conventional high fat diet to cause adverse metabolic effects and gastric symptoms, difficult to distinguish from heart attack.

Gastrointestinal tolerance studies with compositions having a similar MCT-LCT composition to this invention have been studied in low birth weight infants, revealing excellent gastrointestinal tolerance. This is the perfect type of study assuming the delicate nature of infantile gastrointestinal tissues.

The Academy indicates that at altitude 2.2 to 2.3× the amount of calories at sea level is necessary for maintaining lean body mass. Current diet increases potential for Chronic Heart Disease and requires modification to increase safe fats. Soldiers deployed in cold environments/high altitude reveal enhanced appetite which may account for the initial 1 kg/month weight gain. This weight gain must be addressed also for low metabolism, confined space individuals, such as submariners and extended stay astronauts.

The importance of satiety is methodically addressed by our formulation. The strategic formulation of the cooking oils developed by micro-molecular hypersaturation in accordance with the instant invention, intentionally has a resulting fatty acid profile with a saturated fat component greater than 50%. This closely resembles the fatty acid profile of human milk. Human milk is divided into two parts. Fore milk, which is primarily a light watery carbohydrate and protein mixture, and hind milk which is primarily saturated fat. This dense hind milk with its inherent saturated fatty acid profile, is what creates the trigger for the infant to stop nursing. Human milk however, contains 25–30% of palmitic acid as part of its saturated fatty acid profile and becomes inherently dangerous for heart disease.

This is due to the high amount of saturated fat. The Medium Chain Triglycerides involved in the hyper-saturation process, although precisely, molecularly configured to provide certain molecules for our process, acts as the trigger mechanism. Studies show in chicken feeding behavior that as early as 30 minutes after feeding cumulative food intake in MCT ($C_8$ and $C_{10}$ supplemented diets) decrease significantly over Long Chain Triglycerides. Another study suggesting satiety with our resulting formulation, reveals that rats showed significant decrease in cumulative food intake in a dose dependent fashion after MCT/LCT and not in LCT.

Furthermore, this cumulative effect is echoed in human studies comparing food intake in dieters and non-dieters following meal containing MCTs. The main finding here was that 30 minutes after consuming their MCT preloads, at all doses, the non-dieters showed a significant decrease in caloric intake, when offered a varied self-selection lunch.

The strategic method used by this invention to address such lean body weight loss is to provide dense, specific fat calories, in the form of cooking oil, to provide a protein and glycogen sparing effect. The same formulation has a satiety effect, which helps with the initial weight gain and calorie intake in the form of volume, for the less metabolically challenged confined space individual.

However, these same individuals from time to time must perform very calorically challenged activities such as EVAs, accounting for 2–3× normal caloric needs and corporal tissue injury, similar to that of high altitude. For example: Astronaut EVA's fighting against a pressurized suit, Submarine deployment of SEAL Teams. Preparation of corporal tissue by chronic ingestion and immediate ingestion prior to activity has very specific benefits. Persistence of metabolic effects after long term oral feeding of traumatized rats by medium chain saturated triglycerides and Omega 3 oil, have shown greater liver weight, total liver protein, % of Leucine flux oxidized, and glucose and insulin increase than long chain fatty acid (safflower oil rich in Omega 6).

Of human significance is that surgically stressed patients, when tested for kinetics of MC Triglycerides and Free Fatty Acids, show that the stressed patient is able to effectively use our special lipid profile in face of increased metabolic demand. Also mentioned is that MCT hydrolysis plays particular importance in those stress situations, such as sepsis or surgery to promote healing. Furthermore, the study indicates that LCT administration, together with MCT administration, is still necessary because LCTs not only provide essential fatty acids but also reduce MCT induced ketogenesis.

This suggests that a soldier in any environment would be best served by our developed formulation in case of injury, an inherent element of warfare. Our formulation takes into account studies showing that a 75% MCT and 25% LCT formulation decreases whole body lipolysis by 53%, in multiple trauma patients. However, this would be harmful for long term, in that it results in clinical Essential Fatty Acid (EFA) deficiency, thereby proving the value of our formulation. Our process answers the call by the Academy, providing the necessary fats for energy, yet significantly reducing the potential of CHD. This is another imperative reason for our strategic formulation of 50% MCT/50% edible oil base.

Of further concern by the Academy, is maintaining a significant amount of carbohydrate in high altitude operations, due to its thermic effect as related to normal fat. Displacement of a significant amount of carbohydrate and LCFA can be successfully accomplished as follows:

CHO is preferred as the primary energy source because of its oxidation characteristics and glycogen sparing. Cycling performance studies of carbohydrate and MCT, show that MCT oxidation decreased the direct and/or indirect oxidation of muscle glycogen. Adequate stores of muscle glycogen are of particular need in intense, prolonged exercise, as indicated by the Academy. Furthermore, subjects showed faster T-trials of CHO+MCT, suggesting a reduced reliance on carbohydrate oxidation at a given Oxygen uptake being similar to an endurance training effect. Therefore our ingested cooking oil as part of military rations would enhance their CHO effectiveness, as well as the general population's, making better utilization of Low-Carbohydrate Diets.

Glucose oxidation is further assisted by 50% MCT-50% LCT infusion, without inhibiting glucose tissue uptake 12–436. The study goes on to suggest interference with glucose tissue uptake in the presence of just LCTs, precisely in line with our suggestive correction of LCT displacement. Of further significance is the study indicating that animals fed Safflower oil (high linoleic LCFA) or lard, showed large decrease in plasma glucose and concomitant increases in plasma ketone bodies, again showing that Linoleic catabolism did not prevent fasting hypoglycemia. This again suggests the necessity to displace LCFA in our focused applications.

When proven glycogen sparing capacities are backed by improvement in protein utilization it becomes an overwhelming argument for lean body mass maintenance. Such studies include further exploration into surgical patients and their ability to improve nitrogen retention, an inherent necessity if protein utilization and sparring is to effectively exist. Documentation supports that our formulation is not only safe, but muscle utilization was significantly improved, again showing an increase in Nitrogen retention. Additionally, kinetic analysis of MCT vs. LCT reveals a 4–6 fold smaller Vmax (protein velocity into brush border membrane vesicles) in the LCT Group. Also of great importance, is the transport of sodium. Sodium independent transport was 10-fold lower in the LCT group than in the MCT group. This is highly suggestive of transport interference by bulky LCFA molecules, and absorbability of important electrolytes, compared to our formulation.

In approaching high altitude operations and artificial atmospheric conditions, no research would be complete without evaluation of how the proposed system would effect oxygenation of pulmonary gases and associated excretory elements. A highly specific study on ventilated patients, individuals without any muscular response to exert any mechanical false positives, performed as a prospective, randomized, crossover trial, revealed the following; 1) that patients infused through intravenous forced feeding where 50% of total caloric energy was supplied by MCT/LCT revealed an increase in oxygen consumption by 27.8% and a minute ventilation increase by 14.3% than conventional LCFA fat, consistent with an increase in metabolic demand. Also of importance is that excretory gases of CO2, PaO2, and PaCO2, were not different between groups. Studies in kinetics and thermogenesis of M Chain monocarboxylic and dicarboxylic acids also reveal similar results of 19% increase in oxygen, suggesting that our triglyceride results are approximately 33% better.

The case for limiting conventional fat, Long Chain Fatty Acids as edible oils in our applications, can also be approached from the area of safety, suggested by research exploring immune system effects of various TPN on T-lymphocyte subpopulations. The research revealed that Long Chain Triglycerides, when compared with our formulation, showed a significant decrease in the ratio of helper to suppressor T-cells.

As extended stay space exploration becomes a reality, the greatest nutritional problem facing NASA is the ability for astronauts to maintain skeletal density. The problem of Calcium mal-absorption and utilization is not unique to space travel and if solved will create solutions for heart patients, osteoporotic individuals, and the like. Examination of mineral absorption, during medium chain fatty acid usage in accordance with formulas as taught by the instant invention, reveals a 13% greater value. This is a profound difference of the benefits of our formulation, especially since increase in Magnesium absorption was also noted. Furthermore, the edible oil formulation of the instant invention may be the only functional bulk food as a dense calorie regimen, that is useful, for example for a Mars voyage since researchers plan on manufacturing non-dense calories on board.

Process of Manufacture

Military rations ideally should have a three year shelf life, a parameter essentially unheard of in cooking oils. Unfortunately, the oxidative degradation of polyunsaturated fatty acids is the primary factor in limiting the shelf life of most manufactured foods. The instant process of Micro-Molecular HyperSaturation or "Microsaturation" creates an oxidative barrier novel to today's food manufacturing processes. The microsaturation process, as instantly disclosed, is illustrated for plant derived cooking oils such as peanut, olive, soybean, canola oils, and the like; and for animal derived oils, such as anhydrous butter oil, beef fat, lard, or the like. These oils are merely illustrative, and it is within the purview of this invention to treat all cooking oils, inclusive of long chain fatty acid containing oils, whether plant or animal derived.

The process of the instant invention begins with a fraction of short and medium chain saturated triglycerides derived from coconut and palm kernel oils, containing about 1–5% of $C_6$, about 65% of $C_8$, and about 30% of $C_{10}$.

In a heated reaction container the structured triglycerides are first introduced in their complete pre-weighed end result configuration; i.e. a 1-1 w/w formulation based on calculated molecular weight ratios of structured triglycerides to cooking oil base is necessary. Therefore, if a 40,000 lb. batch is in production, 20,000 lbs. of structured triglycerides would comprise the first ingredient. The triglycerides are vertically agitated at a velocity of about 3–10 mph, while the container steadily increases the temperature of the compounds to between about 85–95° F. This is a very functional and critical process step which significantly increases the molecular kinetics, and creates a changing intramolecular spatial configuration between molecules, thus preparing the totally transparent liquid for receipt of the cooking oil base.

The cooking oil base is next prepared for introduction. This oil should be at room temperature, about 10–20° F. less than the temperature of the agitated triglycerides. As the base is introduced to the reaction container, a cloudy, turbid phase begins. The warm saturated triglycerides, with their inherent excellent water miscibility, begin to strip off the unsaturated long chain fatty acids, which in some cases are three times or more the molecular weight, from their counterparts, surrounding them and creating a saturated spatial configuration.

This is a physical mixture and there is no intended alignment of fatty acids, such as in structured, unsaturated bond alignment or chemical hydrogenation of LCFAs.

The process now nears completion, as agitation progresses and the total of LCFAs are added to the mixture.

Completion of the process is indicated by a very sharply delineated clarity of the mixture, indicating complete intra-spatial saturation. This resulting product now uses the saturated micro molecules as "oxidative bumper guards" for the LCFAs. The pre-calculated molecular ratios of "micro molecules" (short & medium carbon $C_6$–$C_{10}$ molecules) to Long Chain Fatty Acids are between about 1.8–2.0. as a result of Micro-Molecular Hyper-Saturation "Microsaturation".

Fatty Acid Compositions of conventional cooking oils vs our technologically advanced products have the following common profiles:

|  | Saturated % | Monounsaturated % | Polyunsaturated |
|---|---|---|---|
| Butter Oil | 36 | 32 | 32 |
| Sat-Butter Oil* | 68** | 16 | 16 |
| Peanut Oil | 17 | 61 | 22 |
| Sat-Peanut Oil* | 59** | 30 | 11 |
| Olive Oil | 14 | 77 | 9 |
| Sat-Olive Oil* | 57** | 38.5 | 4.5 |
| Soybean oil | 15 | 21 | 61 |
| Sat-Soybean Oil* | 57.5** | 12 | 30.5 |
| Canola Oil | 6 | 58 | 36 |
| Sat-Canola Oil* | 53** | 29 | 18 |

*Result of Micro-Molecular Hyper-Saturation
**>50% of this resulting saturated fat will be metabolized by the liver as energy and will not be deposited as fat.

Unfortunately, the food industry has made decisions to modify cooking oils, for commercialization reasons, that do not provide the best health benefits to the public. The industry has hydrogenised cooking oils to increase their shelf lives, and allow them to be used at high heat for frying. It has been shown in many studies that the above modifications have proven unhealthy to the human population, with 500,000 people dying from CHD each year. This has placed a significant financial and emotional burden upon surviving family members.

The formulation of the instant invention also acts as an aid to reduction of triglyceride levels and serum cholesterol levels.

In one study, over approximately a 90 day period, triglyceride levels dropped 51% and serum cholesterol dropped 15% as a result of substituting the product produced in accordance with the instant invention for conventional cooking oils.

Additionally, utilization of the instant product eliminates the need for hydrogenation while significantly increasing the shelf life of products that substitute the instant formulation for current oils.

All patents and publications mentioned in this specification are indicative of the levels of those skilled in the art to which the instant invention pertains. All patents and publications are herein incorporated by reference to the same extent as if each individual patent and publication was specifically and individually indicated to be incorporated by reference.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification.

One skilled in the art will readily appreciate that the present invention is well adapted to carry out the objects and obtain the ends and advantages mentioned, as well as those inherent therein. Any oligonucleotides, peptides, polypeptides, biologically related compounds, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed various modifications of the described modes for carrying out the invention which are obvious to those skilled in the art are intended to be within the scope of the following claims.

What is claimed is:

1. A process for microsaturation of cooking oils consisting of:

providing a structured triglyceride mixture containing an amount of short and medium chain saturated triglycerides derived from coconut oil, palm kernel oil or mixtures thereof, said mixture consisting of about 1–5% of $C_6$, about 65% of $C_8$, and about 30% of $C_{10}$;

providing an equal amount, on a weight basis, of a long chain fatty acid containing cooking oil base;

placing said structured triglycerides in a container;

vortically agitating said structured triglycerides at a velocity of about 3–10 mph, while said structured triglycerides are heated to a temperature of between about 85–95° F.;

introducing said equal amount, on a weight basis, of said long chain fatty acid containing cooking oil to said container at a temperature of about 10–20° F. less than the temperature of the agitated triglycerides, whereby a turbid mixture is created; and continuing agitation until said turbid mixture clarifies;

wherein intra-spatial saturation of said structured triglycerides and long chain fatty acids results in a microsaturated product having a molecular ratio of $C_6$–$C_{10}$ molecules to long chain fatty acid molecules of between about 1.8–2.0.

2. The process of claim 1, wherein said cooking oil base is selected from plant derived cooking oils, animal derived cooking oils, or combinations thereof.

3. The process of claim 2 wherein said plant derived cooking oil is selected from the group consisting of peanut oil, olive oil, soybean oil or canola oil.

4. The process of claim 2, wherein said animal derived oil is selected from the group consisting of anhydrous butter oil, beef fat, and lard.

5. The product produced in accordance with the process of claim 1.

6. The product produced in accordance with the process of claim 2.

7. The product produced in accordance with the process of claim 3.

8. The product produced in accordance with the process of claim 4.

* * * * *